(12) United States Patent
Landais et al.

(10) Patent No.: US 11,765,618 B2
(45) Date of Patent: Sep. 19, 2023

(54) WIRELESS COMMUNICATION SYSTEM

(71) Applicant: NOKIA TECHNOLOGIES OY, Espoo (FI)

(72) Inventors: Bruno Landais, Pleumeur-Bodou (FR); Saurabh Khare, Bangalore (IN)

(73) Assignee: NOKIA TECHNOLOGIES OY, Espoo (FI)

( * ) Notice: Subject to any disclaimer, the term of this patent is extended or adjusted under 35 U.S.C. 154(b) by 20 days.

(21) Appl. No.: 17/201,932

(22) Filed: Mar. 15, 2021

(65) Prior Publication Data

US 2021/0297896 A1 Sep. 23, 2021

(30) Foreign Application Priority Data

Mar. 20, 2020 (IN) .............................. 202041012192

(51) Int. Cl.
*H04W 28/02* (2009.01)
*H04L 69/22* (2022.01)
*H04L 67/56* (2022.01)
*H04L 69/24* (2022.01)

(52) U.S. Cl.
CPC ......... *H04W 28/0289* (2013.01); *H04L 67/56* (2022.05); *H04L 69/22* (2013.01); *H04L 69/24* (2013.01)

(58) Field of Classification Search
CPC . H04W 28/00; H04W 28/02; H04W 28/2089; H04L 69/00; H04L 69/22; H04L 67/00; H04L 67/28
See application file for complete search history.

(56) References Cited

U.S. PATENT DOCUMENTS

| | | | | |
|---|---|---|---|---|
| 7,299,276 B1* | 11/2007 | Strawn | ................ | H04L 67/1001 709/224 |
| 9,232,002 B1* | 1/2016 | Sorenson, III | ...... | H04L 67/1034 |
| 9,699,045 B2 | 7/2017 | Roach et al. | | |
| 2003/0140140 A1* | 7/2003 | Lahtinen | ................. | H04L 41/28 709/224 |
| 2006/0136564 A1* | 6/2006 | Ambrose | ................ | H04L 67/02 709/217 |
| 2006/0155862 A1* | 7/2006 | Kathi | ...................... | H04L 45/38 709/217 |

(Continued)

FOREIGN PATENT DOCUMENTS

| | | | | | |
|---|---|---|---|---|---|
| JP | | 2020095340 | * | 6/2020 | ............. G06F 12/00 |
| WO | WO | 2015/048992 A1 | | 4/2015 | |
| WO | WO-2021057692 A1 | | * | 4/2021 | ........... H04L 67/141 |

OTHER PUBLICATIONS

"3rd Generation Partnership Project; Technical Specification Group Core Network and Terminals; 5G System; Technical Realization of Service Based Architecture; Stage 3 (Release 16)", 3GPP TS 29.500 v16.2.1 (Jan. 2020), 50 pages.

(Continued)

*Primary Examiner* — Warner Wong
(74) *Attorney, Agent, or Firm* — Alston & Bird LLP (57) ABSTRACT

There is provided an apparatus with means for issuing (S601) a request message to a first proxy function for forwarding to a network server. The means are further configured for receiving (S603) a response message from the first proxy function. The response message comprises information about a signalling capacity of the first proxy function.

17 Claims, 8 Drawing Sheets

(56) References Cited

U.S. PATENT DOCUMENTS

| | | | | |
|---|---|---|---|---|
| 2006/0167975 | A1* | 7/2006 | Chan | H04L 67/14 709/203 |
| 2007/0198721 | A1* | 8/2007 | Ikawa | H04L 67/1012 709/226 |
| 2011/0137973 | A1* | 6/2011 | Wei | H04L 67/1001 709/202 |
| 2014/0112138 | A1* | 4/2014 | Kahn | H04L 43/0876 370/235 |
| 2014/0211813 | A1* | 7/2014 | Gochi Garcia | H04L 67/02 370/477 |
| 2014/0376380 | A1* | 12/2014 | Campbell | H04L 47/10 370/236 |
| 2015/0319267 | A1* | 11/2015 | Donovan | H04L 63/0892 709/203 |
| 2016/0241528 | A1* | 8/2016 | Kulkarni | H04L 67/568 |
| 2016/0285992 | A1* | 9/2016 | Katsev | H04L 67/5682 |
| 2017/0006128 | A1* | 1/2017 | Graham-Cumming | H04L 67/568 |
| 2021/0200587 | A1* | 7/2021 | Yi | H04L 67/56 |

OTHER PUBLICATIONS

"3rd Generation Partnership Project; Technical Specification Group Services and System Aspects; Procedures for the 5G System (5GS); Stage 2 (Release 16)" 3GPP TS 23.502 v16.3.0 (Dec. 22, 2019), 558 pages.

"3rd Generation Partnership Project; Technical Specification Group Services and System Aspects; System architecture for the 5G System (5GS); Stage 2 (Release 16)", 3GPP TS 23.501 v16.3.0 (Dec. 2019), 417 pages.

Fielding et al., "Hypertext Transfer Protocol (HTTP/1.1): Message Syntax and Routing", Internet Engineering Task Force (IETF) Request for Comments: 7230, (Jun. 2014), 89 pages.

Huawei et al., "3GPP Rel-16 LOLC implications on Nnrf service", 3GPP TSG-CT WG4 Meeting #96e, C4-200320, (Feb. 17-28, 2020), 18 pages.

Huawei et al., "Description of the 3GPP Rel-16 OLC", 3GPP TSG-CT WG4 Meeting #96e, C4-201186, (Feb. 17-28, 2020), 11 pages.

Huawei et al., "Dynamic Load Control", 3GPP TSG-CT WG4 Meeting #96e, C4-201219, (Feb. 17-28, 2020), 8 pages.

Extended European Search Report for European Application No. 21163548.7 dated Aug. 5, 2021, 9 pages.

Huawei et al., "Solution for Overload Conveyance by Signalling", 3GPP TSG CT WG4 Meeting #89, C4-190615, (Feb. 25-Mar. 1, 2019), 3 pages.

Office Action for European Application No. 21163548.7 dated Feb. 22, 2023, 7 pages.

* cited by examiner

WIRELESS COMMUNICATION SYSTEM

CROSS-REFERENCE TO RELATED APPLICATIONS

This application claims priority to Indian Patent Application No. 202041012192, filed Mar. 20, 2020, the entire contents of which are incorporated herein by reference.

FIELD

The present application relates to a method, apparatus, and computer program for a wireless communication system.

BACKGROUND

A communication system can be seen as a facility that enables communication sessions between two or more entities such as user terminals, base stations/access points and/or other nodes by providing carriers between the various entities involved in the communications path. A communication system can be provided, for example, by means of a communication network and one or more compatible communication devices. The communication sessions may comprise, for example, communication of data for carrying communications such as voice, electronic mail (email), text message, multimedia and/or content data and so on. Non-limiting examples of services provided comprise two-way or multi-way calls, data communication or multimedia services and access to a data network system, such as the Internet.

SUMMARY

According to an aspect, there is provided an apparatus comprising means for: issuing a request message to a first proxy function for forwarding to a network server; and receiving a response message from the first proxy function, the response message comprising information about a signalling capacity of the first proxy function.

The first proxy function may comprise one of: a service communication proxy, and a security edge protection proxy.

The information about the signalling capacity of the first proxy function, may be comprised within a header of the response message.

The header may comprise an identifier of the first proxy function to link the information about the signalling capacity with the first proxy function.

The response message may additionally comprise information about a signalling capacity of the network server.

The means may be further configured to perform: issuing a further request message to at least one of: the first proxy function, a further proxy network function, and directly to the network server, based on the received information about the signalling capacity of the first proxy function.

The information about the signalling capacity may comprise at least one of: load control information and overload control information of the first proxy function.

The means for issuing a further request message may be for issuing the further request message to a further proxy function when the received overload control information indicates that the first proxy function is in an overload condition.

The means may be for issuing the further request message to the first proxy function at a reduced rate according to the overload control information.

The means for issuing a further request message may be for issuing the further request message to a further proxy function when the received load control information indicates that the first proxy function has at least one of: a load above a predetermined threshold, and a load above a load of the further proxy function.

The means for issuing a further request message may be for issuing the further service request directly to the network server when at least one of: the received overload control information indicates that the first proxy function is in an overload condition, and the received load control information indicates that the first proxy function has a load above a predetermined threshold.

The apparatus may be comprised in a network client.

According to an aspect, there is provided an apparatus at a first proxy function comprising means for: receiving a request message from a network client for forwarding to a network server; and providing a response message to the network client, the response message comprising information about a signalling capacity of the first proxy function.

The information about the signalling capacity may comprise at least one of: load control information and overload control information of the first proxy function.

The first proxy function may comprise one of: a service communication proxy, and a security edge protection proxy.

The information about the signalling capacity of the first proxy function, may be comprised within a header of the response message.

The header may comprise an identifier of the first proxy function to link the information about the signalling capacity with the first proxy function.

The response message may additionally comprise information about a signalling capacity of the network server.

The means may be further configured to perform: providing the request message to the network server.

The response message may comprise information about a signalling capacity of the network server.

According to another aspect, there is provided an apparatus comprising: at least one processor; and at least one memory including computer program code, the at least one memory and the computer program code configured to, with the at least one processor, cause the apparatus at least to perform: issuing a request message to a first proxy function for forwarding to a network server; and receiving a response message from the first proxy function, the response message comprising information about a signalling capacity of the first proxy function.

The first proxy function may comprise one of: a service communication proxy, and a security edge protection proxy.

The information about the signalling capacity of the first proxy function, may be comprised within a header of the response message.

The header may comprise an identifier of the first proxy function to link the information about the signalling capacity with the first proxy function.

The response message may additionally comprise information about a signalling capacity of the network server.

The at least one memory and the computer program code with the at least one processor, may cause the apparatus to perform: issuing a further request message to at least one of: the first proxy function, a further proxy network function, and directly to the network server, based on the received information about the signalling capacity of the first proxy function.

The information about the signalling capacity may comprise at least one of: load control information and overload control information of the first proxy function.

The at least one memory and the computer program code with the at least one processor, may cause the apparatus to perform: issuing the further request message to a further proxy function when the received overload control information indicates that the first proxy function is in an overload condition.

The at least one memory and the computer program code with the at least one processor, may cause the apparatus to perform: issuing the further request message to the first proxy function at a reduced rate according to the overload control information.

The at least one memory and the computer program code with the at least one processor, may cause the apparatus to perform: issuing the further request message to a further proxy function when the received load control information indicates that the first proxy function has at least one of: a load above a predetermined threshold, and a load above a load of the further proxy function.

The at least one memory and the computer program code with the at least one processor, may cause the apparatus to perform: issuing the further service request directly to the network server when at least one of: the received overload control information indicates that the first proxy function is in an overload condition, and the received load control information indicates that the first proxy function has a load above a predetermined threshold.

According to another aspect, there is provided an apparatus at a first proxy function comprising: at least one processor; and at least one memory including computer program code, the at least one memory and the computer program code configured to, with the at least one processor, cause the apparatus at least to perform: receiving a request message from a network client for forwarding to a network server; and providing a response message to the network client, the response message comprising information about a signalling capacity of the first proxy function.

The information about the signalling capacity may comprise at least one of: load control information and overload control information of the first proxy function.

The first proxy function may comprise one of: a service communication proxy, and a security edge protection proxy.

The information about the signalling capacity of the first proxy function, may be comprised within a header of the response message.

The header may comprise an identifier of the first proxy function to link the information about the signalling capacity with the first proxy function.

The response message may additionally comprise information about a signalling capacity of the network server.

The at least one memory and the computer program code with the at least one processor, may cause the apparatus to perform: providing the request message to the network server.

The response message may comprise information about a signalling capacity of the network server.

According to an aspect there is provided a method comprising: issuing a request message to a first proxy function for forwarding to a network server; and receiving a response message from the first proxy function, the response message comprising information about a signalling capacity of the first proxy function.

The first proxy function may comprise one of: a service communication proxy, and a security edge protection proxy.

The information about the signalling capacity of the first proxy function, may be comprised within a header of the response message.

The header may comprise an identifier of the first proxy function to link the information about the signalling capacity with the first proxy function.

The response message may additionally comprise information about a signalling capacity of the network server.

The method may comprise issuing a further request message to at least one of: the first proxy function, a further proxy network function, and directly to the network server, based on the received information about the signalling capacity of the first proxy function.

The information about the signalling capacity may comprise at least one of: load control information and overload control information of the first proxy function.

The method may comprise issuing the further request message to a further proxy function when the received overload control information indicates that the first proxy function is in an overload condition.

The method may comprise issuing the further request message to the first proxy function at a reduced rate according to the overload control information.

The method may comprise issuing the further request message to a further proxy function when the received load control information indicates that the first proxy function has at least one of: a load above a predetermined threshold, and a load above a load of the further proxy function.

The method may comprise issuing the further service request directly to the network server when at least one of: the received overload control information indicates that the first proxy function is in an overload condition, and the received load control information indicates that the first proxy function has a load above a predetermined threshold.

The method may be performed by a network client.

According to an aspect there is provided a method comprising: receiving a request message from a network client for forwarding to a network server; and providing a response message to the network client, the response message comprising information about a signalling capacity of the first proxy function.

The information about the signalling capacity may comprise at least one of: load control information and overload control information of the first proxy function.

The first proxy function may comprise one of: a service communication proxy, and a security edge protection proxy.

The information about the signalling capacity of the first proxy function, may be comprised within a header of the response message.

The header may comprise an identifier of the first proxy function to link the information about the signalling capacity with the first proxy function.

The response message may additionally comprise information about a signalling capacity of the network server.

The method may comprise providing the request message to the network server.

The response message may comprise information about a signalling capacity of the network server.

The method may be performed by a first proxy function.

According to an aspect there is provided a computer program comprising computer executable instructions which when run on one or more processors perform: issuing a request message to a first proxy function for forwarding to a network server; and receiving a response message from the first proxy function, the response message comprising information about a signalling capacity of the first proxy function.

According to an aspect there is provided a computer program comprising computer executable instructions which when run on one or more processors perform: receiving a request message from a network client for forwarding to a network server; and providing a response message to the network client, the response message comprising information about a signalling capacity of a first proxy function.

A computer product stored on a medium may cause an apparatus to perform the methods as described herein.

An electronic device may comprise apparatus as described herein.

In the above, various aspects have been described. It should be appreciated that further aspects may be provided by the combination of any two or more of the various aspects described above.

Various other aspects and further embodiments are also described in the following detailed description and in the attached claims.

According to some aspects, there is provided the subject matter of the independent claims. Some further aspects are defined in the dependent claims. The embodiments that do not fall under the scope of the claims are to be interpreted as examples useful for understanding the disclosure.

List of abbreviations:

| | |
|---|---|
| AF: | Application Function |
| AUSF: | Authentication Server Function |
| AMF: | Access Management Function |
| BS: | Base Station |
| DN: | Data Network |
| DU: | Distributed Unit |
| eNB: | eNodeB |
| eSBA: | Enhanced Service Based Architecture |
| FQDN: | Fully Qualified Domain Name |
| gNB: | gNodeB |
| HTTP: | Hypertext Transfer Protocol |
| LTE: | Long Term Evolution |
| NEF: | Network Exposure Function |
| NF: | Network Function |
| NR: | New radio |
| NRF: | Network Repository Function |
| MS: | Mobile Station |
| PLMN: | Public Land Mobile Network |
| RAN: | Radio Access Network |
| RF: | Radio Frequency |
| RRC: | Radio Resource Control |
| SBA: | Service Based Architecture |
| SBI: | Service Based Interface |
| SCP: | Service Communication Proxy |
| SEPP: | Security Edge Protection Proxy |
| UE: | User Equipment |
| 3GPP: | $3^{rd}$ Generation Partnership Project |
| 5G: | $5^{th}$ Generation |
| 5GC: | 5G Core network |
| 5G-AN: | 5G Radio Access Network |
| 5GS: | 5G System |

DESCRIPTION OF FIGURES

Embodiments will now be described, by way of example only, with reference to the accompanying Figures in which.

DETAILED DESCRIPTION

Before explaining in detail some examples of the present disclosure, certain general principles of a wireless communication system and mobile communication devices are briefly explained with reference to FIGS. 1 to 3 to assist in understanding the technology underlying the described examples.

Figure 1:
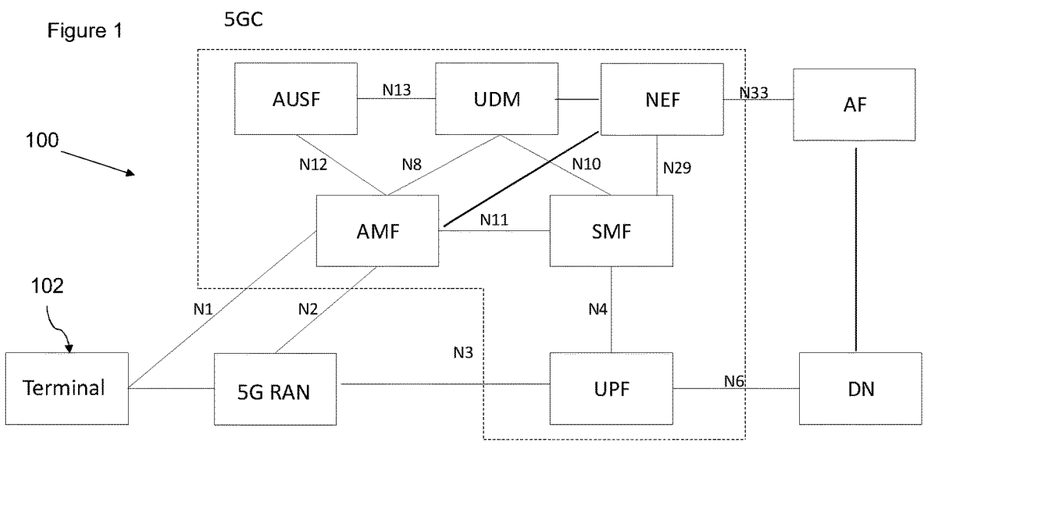
FIG. 1 shows a schematic representation of a 5G system.

In a wireless communication system 100, such as that shown in FIG. 1, mobile communication devices/terminals or user apparatuses, and/or user equipments (UE), and/or machine-type communication devices 102 are provided wireless access via at least one base station (not shown) or similar wireless transmitting and/or receiving node or point. A communication device is provided with an appropriate signal receiving and transmitting apparatus for enabling communications, for example enabling access to a communication network or communications directly with other devices. The communication device may access a carrier provided by a station or access point, and transmit and/or receive communications on the carrier.

In the following certain examples are explained with reference to mobile communication devices capable of communication via a wireless cellular system and mobile communication systems serving such mobile communication devices. Before explaining in detail the examples of disclose, certain general principles of a wireless communication system, access systems thereof, and mobile communication devices are briefly explained with reference to FIGS. 1, 2 and 3 to assist in understanding the technology underlying the described examples.

FIG. 1 shows a schematic representation of a 5G system (5GS). The 5GS may comprises a terminal, a 5G access network (5G-AN), a 5G core network (5GC), one or more network functions (NF), one or more application function (AF) and one or more data networks (DN).

The 5G-AN may comprise one or more gNodeB (gNB) distributed unit functions connected to one or more gNodeB (gNB) centralized unit functions.

The 5GC may comprise an access management function (AMF), a session management function (SMF), an authentication server function (AUSF), a user data management (UDM), a user plane function (UPF), a network exposure function (NEF) and/or other NFs. Some of the examples as shown below may be applicable to 3GPP 5G standards. However, some examples may also be applicable to 4G, 3G and other 3GPP standards.

In a communication system, such as that shown in FIG. 1, mobile communication devices/terminals or user apparatuses, and/or user equipments (UE), and/or machine-type communication devices are provided with wireless access via at least one base station or similar wireless transmitting and/or receiving node or point. The terminal is provided with an appropriate signal receiving and transmitting apparatus for enabling communications, for example enabling access to a communication network or communications directly with other devices. The communication device may access a carrier provided by a station or access point, and transmit and/or receive communications on the carrier.

Figure 2:
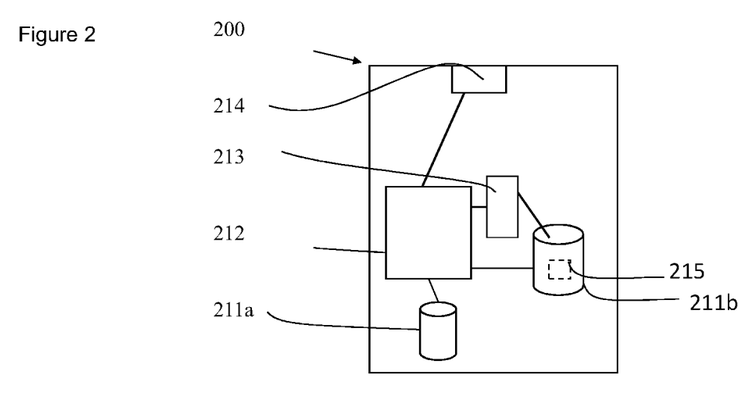
FIG. 2 shows a schematic representation of a control apparatus.

FIG. 2 illustrates an example of a control apparatus 200 for controlling a function of the 5G-AN or the 5GC as illustrated on FIG. 1. The control apparatus may comprise at least one random access memory (RAM) 211a, at least on read only memory (ROM) 211b, at least one processor 212, 213 and an input/output interface 214. The at least one processor 212, 213 may be coupled to the RAM 211a and the ROM 211b. The at least one processor 212, 213 may be configured to execute an appropriate software code 215. The software code 215 may for example allow to perform one or more steps to perform one or more of the present aspects. The software code 215 may be stored in the ROM 211b. The control apparatus 200 may be interconnected with another control apparatus 200 controlling another function of the 5G-AN or the 5GC. In some examples, each function of the 5G-AN or the 5GC comprises a control apparatus 200. In alternative examples, two or more functions of the 5G-AN or the 5GC may share a control apparatus.

Figure 3:
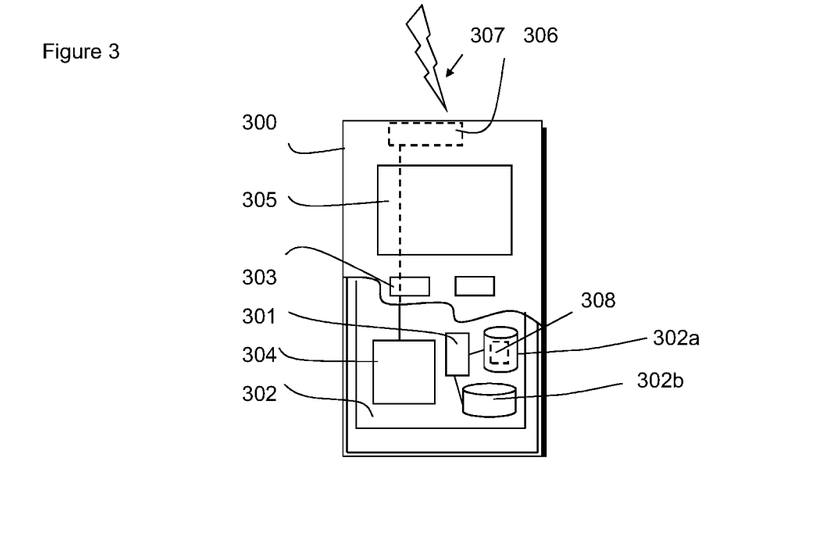
FIG. 3 shows a schematic representation of a terminal.

FIG. 3 illustrates an example of a terminal 300, such as the terminal illustrated on FIG. 1. The terminal 300 may be provided by any device capable of sending and receiving radio signals. Non-limiting examples comprise a user equipment, a mobile station (MS) or mobile device such as a mobile phone or what is known as a 'smart phone', a computer provided with a wireless interface card or other wireless interface facility (e.g., USB dongle), a personal data assistant (PDA) or a tablet provided with wireless communication capabilities, a machine-type communications (MTC) device, a Cellular Internet of things (CIoT) device or any combinations of these or the like. The terminal 300 may provide, for example, communication of data for carrying communications. The communications may be one or more of voice, electronic mail (email), text message, multimedia, data, machine data and so on.

The terminal 300 may receive signals over an air or radio interface 307 via appropriate apparatus for receiving and may transmit signals via appropriate apparatus for transmitting radio signals. In FIG. 3 transceiver apparatus is designated schematically by block 306. The transceiver apparatus 306 may be provided for example by means of a radio part and associated antenna arrangement. The antenna arrangement may be arranged internally or externally to the mobile device.

The terminal 300 may be provided with at least one processor 301, at least one memory ROM 302a, at least one RAM 302b and other possible components 303 for use in software and hardware aided execution of tasks it is designed to perform, including control of access to and communications with access systems and other communication devices. The at least one processor 301 is coupled to the RAM 302a and the ROM 211b. The at least one processor 301 may be configured to execute an appropriate software code 308. The software code 308 may for example allow to perform one or more of the present aspects. The software code 308 may be stored in the ROM 302b.

The processor, storage and other relevant control apparatus can be provided on an appropriate circuit board and/or in chipsets. This feature is denoted by reference 304. The device may optionally have a user interface such as key pad 305, touch sensitive screen or pad, combinations thereof or the like. Optionally one or more of a display, a speaker and a microphone may be provided depending on the type of the device.

3GPP CT4 is due to complete the Rel-16 stage 3 work on enhanced Service Based Architecture (eSBA). eSBA introduces the support of indirect communication between a network function (NF) Service Consumer and a NF Service Producer via one or more Service Communication Proxy (SCP). This is also referred to as Model C & D (see Annexes E and G of 3GPP TS 23.501). This is in addition to direct communications where NFs interact directly with each other. Details on the technical realization of support of indirect communication are found in clause 6.10 of 3GPP TS 29.500. 3GPP CT4 standardises load and overload control solutions in Rel-16. However, some issues with these releases are not solved. For example, specifying potential additional extensions for the support of load and overload control for indirect communications.

Service Communication Proxy (SCP) is a network entity of the 5G core network. Signalling flows may pass through SCP. An SCP may have a complete network view (obtained from the NRF) which can be used to take several actions, such as for example, failover as and when needed, end-to-end signalling tracing and central monitoring which can make network-wide troubleshooting easier. The SCP may provide a point of entry for a cluster of NFs. The SCP may support the discovery and selection of an NF service producer on behalf of an NF service consumer (referenced as "delegated discovery" in 3GPP specifications). This allows the SCP to become a delegated discovery point in a data centre.

Multiple SCPs may be deployed in networks using indirect communications. When issuing a service request using indirect communication, an NF service consumer, for example an HTTP client may select an SCP towards which the NF service consumer sends the request. The NF service consumer may discover and select the SCP based on, for example, a local configuration and operator policy. In other examples, the NF service consumer may select the SCP using other suitable means. For instance, the addresses of two or more SCPs may be configured in NFs, with SCPs working in active-active mode.

In some examples, an HTTP client acting as a NF service consumer may distribute network traffic among multiple SCPs based on a round-robin approach or other suitable methods.

However, there are problems associated with this approach:

1) The HTTP clients cannot select the SCP based on the dynamic load of the SCP and distribute the traffic accordingly. This can result in unequal load distribution by HTTP clients on the SCPs. This can overload some of the SCPs and cause failures of the overloaded SCP to process the service request. Distributing the signalling without considering the actual instantaneous load of SCPs does not consider instances of deployments wherein the SCPs have different processing capabilities. It also does not consider cases where new SCP instances are instantiated in the network or are restarted thus having very little load.

2) An SCP in overload has no means to signal to HTTP clients that they should reduce the signalling traffic they send towards the SCP. This may lead to the SCP receiving service requests exceeding the maximum number of requests it can support and causing a possible crash of the SCP.

Figure 4:
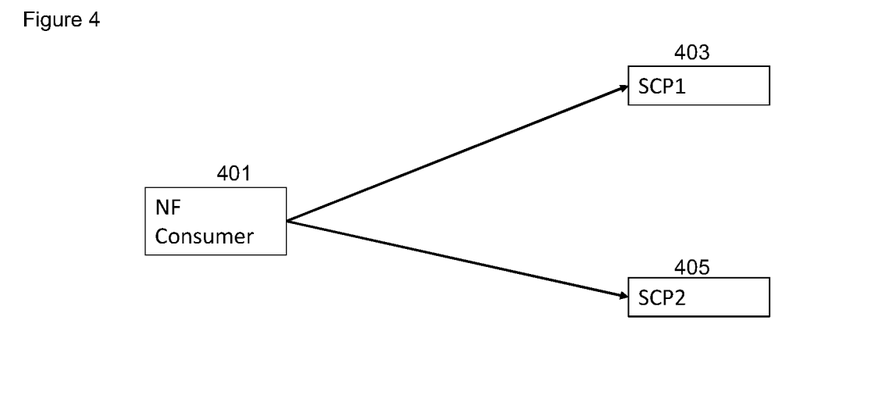
FIG. 4 shows a schematic representation of communications between a network function and service communication proxies.

An example is shown in FIG. 4. FIG. 4 shows a consumer NF1 401 which is connected to two SCPs, namely SCP1 403 and SCP2 405. The consumer 401 distributes the traffic among these SCPs 403, 405 using, for example, a round-robin method. A round robin method may comprise distributing the traffic in equal portions to both SCPs 403, 405. Both SCP 403, 405 addresses may be configured in the NF1 consumer 401. For example, a fully qualified domain name or IP address could be used as an address of the SCP 403, 405. If SCP1 is in overload situation wherein the load of SCP1 403 is reaching to 80%, but SCP2 405 is at 20% load, there is no way for SCP1 403 to inform the consumer 401 that SCP1 403 is in 80% load and the consumer should send more traffic towards SCP2, rather than SCP1. Also, SCP1 403 cannot signal to the NF service consumer 401 that it should reduce the traffic it sends towards SCP1 403. It should be understood that the values used above to indicate overload are shown an example values only. In other examples, other suitable values can be used.

Some 3GPP custom header have been defined. For example, HTTP custom headers "3gpp-Sbi-Lci" and "3gpp-Sbi-Oci" have been defined for the 5G core network Service Based Interfaces (SBI). These headers may allow a NF to learn load control information or overload control information of the NF service producer. Load control information (LCI) may provide information regarding the load capacity of the NF. LCI may provide information about the operating status of the resources available to that NF. As an example only, if an LCI indicated a load metric of 25% then this may correspond to a 25% usage of the resource capabilities of the entity providing the LCI. Resource capabilities may comprise, for example, memory resources or processing resources. Overload control information (OCI) may be used by a NF becoming or being overloaded. OCI may be used in an attempt to reduce an incoming signalling load for an NF. An NF may instruct peers to reduce sending traffic according to the NFs available signalling, by transmitting OCI. As an example only, if an OCI indicated a overload reduction metric of 50% then this may correspond to a request for the receiver of that OCI to reduce the traffic it sends to the transmitting entity by 50%. The values of load metric and overload reduction metric are given as examples only. In other examples, other suitable values may be used.

However, there is no defined solution for managing load and overload for a service communication proxy (SCP) or a security edge protection proxy (SEPP). SEPP in 5G has similar functionality as the DEA does in 4G systems. SEPP is provided on the edge of the network protecting the network from threats. In some examples, SEPP can perform topology hiding, traffic throttling, and roaming partner management.

Therefore, it has been identified that there are no ways of determining load and controlling overload situations for SCP or SEPP. Examples of this disclosure will address these problems.

Some embodiments allow an SCP or SEPP to signal information about signalling capacity to peer NFs or SCPs/SEPPs. The signalling capacity may be 'dynamic' information reflecting the available resources of the SCP or SEPP to process incoming requests. In some examples, an SCP or SEPP may signal load and/or overload information to peer NFs/SCPs/SEPPs. This can enable NF service consumers, for example HTTP clients, to distribute the load across the available SCPs or SEPPs according to the signalled load and/or overload information. Therefore, an NF service consumer can reduce their traffic towards overloaded SCP/SEPPs. This will be described in detail below.

In an example, an SCP or SEPP may signal its load control information to an NF service consumer. In an example, the NF service consumer may be an HTTP client. In other examples, the NF service consumer may be another suitable consumer. An SCP or SEPP may signal its load information by including a "3gpp-Sbi-Lci" header in HTTP responses (with any HTTP status code) or notification requests it forwards or originates, with information identifying the SCP or SEPP.

The 3gpp-Sbi-Lci header may contain the load control information (LCI) of the SCP or SEPP. The 3gpp-Sbi-Lci header may be defined, in an example, as follows:
  3gpp-Sbi-Lci="3gpp-Sbi-Lci:" SP timestamp SP IcMetric SP IcScope IcScope=IciScope OWS [dnn] OWS [sNssai]

The mandatory structured parameter, which in the actual header may be replaced by its sub-parameters.
  IciScope=("NF-Instance=" nfinst)/("NF-Set=" nfset)/" (NF-Service-Instance=" c)/("NF-Service-Set=" nfserviceset)/("SCP=" fqdn)/("SEPP=" fqdn) ";"

with the fully qualified domain name (fqdn) containing the SCP and SEPP FQDN respectively. Alternatively, the scope information may contain other identifiers of the SCP or SEPP. For example, an identifier of the SCP or SEPP may take the form of a UUID (Universally Unique Identifier).

An HTTP response or a notification request may additionally convey an 3gpp-Sbi-Lci header with the load control information signalled by the NF service producer, i.e. two 3gpp-Sbi-Lci headers may be present in the same HTTP response or notification request. In another example, a single header may be used with a comma separating a list of load control information.

In an example, no load control information is received from an NF service producer. The following example header shows load control information being inserted by an SCP/SEPP:
  3gpp-Sbi-Lci: Timestamp: Tue, 4 Feb. 2020 08:49:37 GMT; Load-Metric: 25%; SCP=scp1.example.com
  3gpp-Sbi-Lci: Timestamp: Tue, 4 Feb. 2020 08:49:37 GMT; Load-Metric: 25%; SEPP=seppxyz.operator.com In another example, load information is received from the NF service producer. The following example header shows load control information being inserted by an SCP/SEPP:
  3gpp-Sbi-Lci: Timestamp: Tue, 4 Feb. 2020 08:49:39 GMT; Load-Metric: 25%; SCP=scptexample.com, Timestamp: Tue, 4 Feb. 2020 08:49:37 GMT; Load-Metric: 55%; NF-Instance=54804518-4191-46b3-955c-ac631f953ed8

In an example, an HTTP response may contain multiple headers. For example, one 3gpp-Sbi-Lci header for SCP load control and another 3gpp-Sbi-Lci header from the NF producer.

The encoding of the header may follow the augmented Backus-Naur form (ABNF) as defined in internet engineering task force (IETF) RFC 7230.

In another example, the SCP/SEPP information about load is sent via an existing "NF-Instance" parameter to the NF service consumer, wherein the SCP/SEPP is identified by a NF Instance ID.

It should be understood that the numbers and domain names used above are shown as examples only.

In another example, an SCP or SEPP may signal its overload control information to an NF service consumer. In another example, an SCP or SEPP may signal its overload control information to an NF service producer. In an example, the NF service consumer or NF service producer may be an HTTP client. In other examples, the NF service consumer or NF service producer may be another suitable consumer or producer respectively.

The SCP or SEPP may signal its overload control information by including a "3gpp-Sbi-Oci" header in HTTP requests or responses (with an HTTP status code) that the SCP or SEPP forwards or originates. The SCP or SEPP may include in the header, information identifying the SCP or SEPP.

The 3gpp-Sbi-Oci header may contain the overload control information (OCI) of SCP or SEPP. The 3gpp-Sbi-Oci header may be defined, for example, as follows:

3gpp-Sbi-Oci="3gpp-Sbi-Oci:" SP timestamp SP validityPeriod SP olcMetric SP olcScope
olcScope=ociScope OWS [dnn] OWS [sNssai]

The mandatory structured parameter, which is the actual header may be replaced by its sub-parameters.

ociScope=("NF-Instance=" nfinst)/("NF-Set=" nfset)/" (NF-Service-Instance=" nfservinst)/("NF-Service-Set=" nfserviceset)/("SCP=" fqdn)/("SEPP=" fqdn) ";"

with the fqdn containing the SCP and SEPP FQDN respectively. Alternatively, the scope information may contain other identifiers of the SCP or SEPP. For example, an identifier of the SCP or SEPP may take the form of a UUID (Universally Unique Identifier).

An HTTP request or response may additionally convey an 3gpp-Sbi-Oci header with the overload control information signalled by the NF service producer or NF service consumer, i.e. two 3gpp-Sbi-Oci headers may be present in the same http request or response. In another example, a single header may be used with a comma separating a list of overload control information.

In an example, no overload control information is received from the NF service producer or consumer. The following example header shows overload control information inserted by an SCP or SEPP:

3gpp-Sbi-Oci: Timestamp: Tue, 4 Feb. 2020 08:49:37 GMT; Period-of-Validity: 75s; Overload-Reduction-Metric: 50%; SCP=scp1.example.com
3gpp-Sbi-Oci: Timestamp: Tue, 4 Feb. 2020 08:49:37 GMT; Period-of-Validity: 75s; Overload-Reduction-Metric: 50%; SEPP=seppxyz.example.com In another example, overload information is received from the NF service producer. The following example header shows overload control information inserted by an SCP/SEPP:

3gpp-Sbi-Oci: Timestamp: Tue, 4 Feb. 2020 08:49:39 GMT; Period-of-Validity: 75s; Overload-Reduction-Metric: 20%; SCP=scptexample.com, Timestamp: Tue, 4 Feb. 2020 08:49:37 GMT; Period-of-Validity: 75s; Overload-Reduction-Metric: 50%; NF-Instance=54804518-4191-46b3-955c-ac631 f953ed8

An HTTP request or response may then contain multiple such headers (e.g. one 3gpp-Sbi-Oci header for SCP overload control and another 3gpp-Sbi-Oci header from the NF producer or consumer). The encoding of the header may follow the augmented Backus-Naur form (ABNF) as defined in internet engineering task force (IETF) RFC 7230.

In another example, the SCP/SEPP information about overload is sent via an existing "NF-Instance" parameter to the NF service consumer, wherein the SCP/SEPP is identified by a NF Instance ID.

It should be understood that the numbers and domain names used above are shown as examples only.

Figure 5:
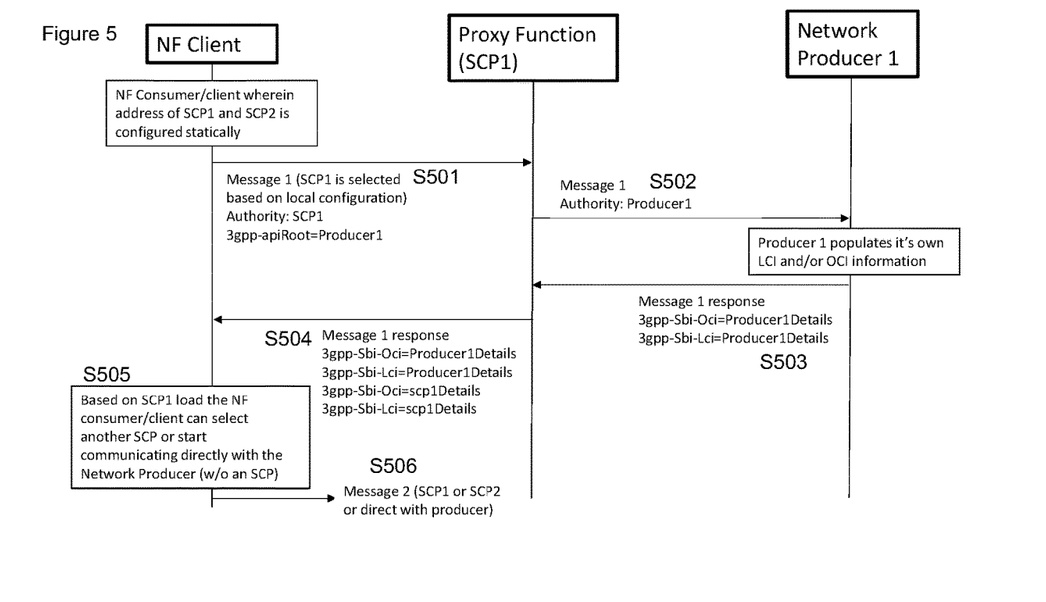
FIG. 5 shows an example signalling diagram between a network client, network proxy and network server.

An example messaging flow is shown in FIG. 5. FIG. 5 shows communications between an NF service consumer/NF consumer/network client, a first proxy function and an NF producer/network server. In the example of FIG. 5, the first proxy function is a first SCP. It should be understood that the terms NF service consumer, NF consumer and network client can be used interchangeably. It should be understood that the terms NF service producer, NF producer and network server can be used interchangeably. An NF service producer can also act as a network client, e.g. when the NF service producer generates notification requests towards an NF service consumer; accordingly, it should also be understood that the terms NF service producer, NF producer and network client can also be used interchangeably. In this example, there is communication and selection of SCPs but it should be understood that this signal flow is also suitable for SEPPs and other proxies. SCPs and SEPPs could be used interchangeably in this signal flow.

The NF consumer may be configured with an address of a first SCP (SCP1) and a second SCP (SCP2) (not shown). Therefore, the NF consumer may communicate with the NF producer via the first SCP or the second SCP. The NF consumer may, for example, be an HTTP client. As an example, the first/second SCP may be identified using an internet protocol (IP) address of the first/second SCP. In another example, the first/second SCP may be identified using a fully qualified domain name of the first/second SCP.

At S501 the NF consumer provides a first message to the first SCP. The first message may be a service request message. In other examples, the first message may be another suitable message type. The first SCP may be selected by the NF consumer based on a local configuration at the NF consumer. The first message may include information defining the destination of the message as the NF producer. As the NF consumer is communicating with the NF producer via a proxy function this may be classed as an indirect communication.

At S502 the first SCP forwards the first message to the NF producer. Once the NF producer received the first message, the NF producer can determine information about the current signalling capacity of the NF producer. This may comprise the NF determining its own OCI and/or LCI information.

At S503 the NF producer provides a first message response to the first SCP. The first message response may comprise the information about the current signalling capacity, such as for example OCI and/or LCI information of the NF producer. For example, the header may comprise the parameters '3gpp-Sbi-Oci=Producer1Details' and/or '3gpp-Sbi-Lci=Producer1Details'.

At S504 the first SCP receives the first message response. The first SCP may add information about a current signalling capacity of the first SCP into the first response message. This may comprise adding OCI and/or LCI of the first SCP into the first response message. Once the additional information about the current signalling capacity has been added into the first message response, this will become a so-called amended first message response. The first SCP then forwards the amended first message response to the NF consumer. For example, the amended header of the first message response may comprise the parameters '3gpp-Sbi-Oci=scp1Details' and/or '3gpp-Sbi-Lci=scp1Details'.

At S505 the NF consumer will determine, based on the received information about the current signalling capacity of the first SCP, whether to select the first SCP or another SCP when performing future communications. For example, if the received information indicates that the first SCP is at a load above a predetermined threshold then the NF consumer may decide not to select the first SCP for future communications. In another example, if the received information indicates that the first SCP is in an overload condition then the NF consumer may decide to reduce traffic it sends towards the first SCP for future communications.

In some examples, the NF consumer may decide to communicate directly with the NF producer without using an SCP when the SCP has advertised an overload condition. In some examples, the NF consumer may decide to communicate directly with an NF producer if all available SCPs have a load above a predetermined threshold or are in an overload.

At S506 the NF consumer will transmit a second message. The destination of the message will be determined as shown above in S505.

A network server may refer to an HTTP server, which can be either an NF service producer or an NF service consumer (when sending requests to a consumer). LCI may only be returned to an NF service consumer. OCI can be sent towards an NF service consumer or a NF service producer.

In other examples, a different signal flow may be implemented by the network functions to the same end. Some messages may have been missed out of the signal flow of FIG. 5. This signal flow is shown as an example only, to help with the understanding of the concept of the disclosure.

Therefore, some embodiments allow NF consumers to select the SCP/SEPP according to their dynamic load status and distribute the load accordingly. This can result in improved load balancing across SCPs/SEPPs. Therefore, there may be a higher success in processing service requests.

Some embodiments allow NF consumers to reduce the traffic they send towards an overloaded SCP or SEPP. Some embodiments allow NF consumers to choose to send messages directly to a NF producer rather than via SCP/SEPP when the SCP/SEPP is overloaded. This may reduce the likelihood of crashing an overloaded SCP or SEPP. This may result in avoiding a crash down of the overloaded SCP or SEPP. Therefore the likelihood of successful request processing may be improved.

Figure 6:
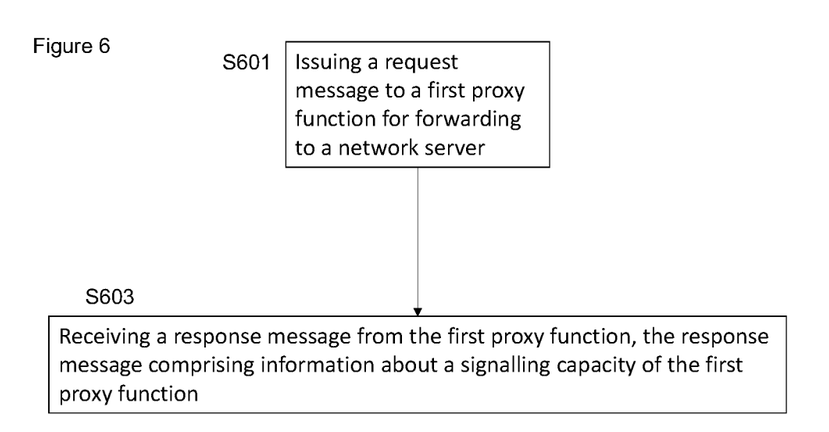
FIG. 6 shows an example method flow diagram performed by a network client.

FIG. 6 shows an example method flow performed by a first apparatus. The first apparatus may be comprised within a NF service consumer or network client.

In S601, the method comprises issuing a request message to a first proxy function for forwarding to a network server.

In S603, the method comprises receiving a response message from the first proxy function, the response message comprising information about a signalling capacity of the first proxy function.

Figure 7:
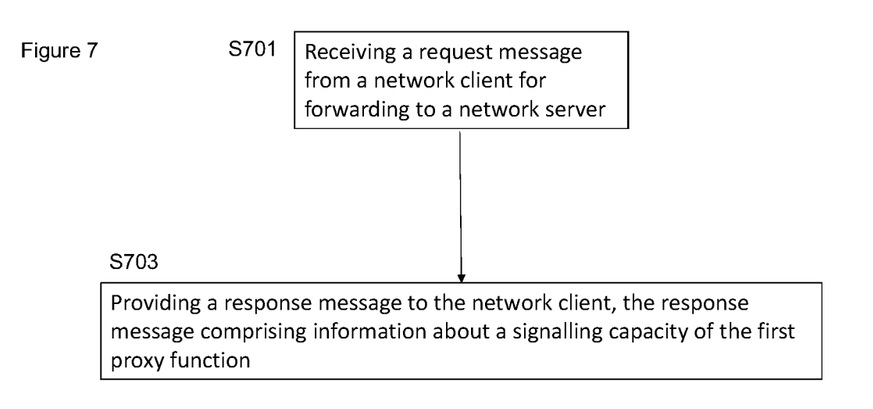
FIG. 7 shows an example method flow diagram performed by a proxy function.

FIG. 7 shows an example method flow performed by second apparatus. The second apparatus may be comprised within an proxy function. For example, a proxy function could be an SCP or an SEPP.

In S701, the method comprises receiving a request message from a network client for forwarding to a network server.

In S703, the method comprises providing a response message to the network client, the response message comprising information about a signalling capacity of a first proxy function.

Figure 8:
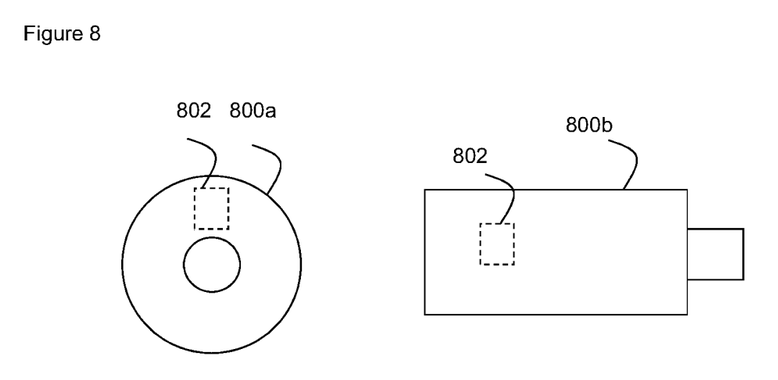
FIG. 8 shows a schematic representation of a non-volatile memory medium storing instructions which when executed by a processor allow a processor to perform one or more of the steps of the method of FIGS. 6 and 7.

FIG. 8 shows a schematic representation of non-volatile memory media 800a (e.g. computer disc (CD) or digital versatile disc (DVD)) and 800b (e.g. universal serial bus (USB) memory stick) storing instructions and/or parameters 802 which when executed by a processor allow the processor to perform one or more of the steps of the methods of FIGS. 6 and 7.

It is noted that while the above describes example embodiments, there are several variations and modifications which may be made to the disclosed solution without departing from the scope of the present invention.

The examples may thus vary within the scope of the attached claims. In general, some embodiments may be implemented in hardware or special purpose circuits, software, logic or any combination thereof. For example, some aspects may be implemented in hardware, while other aspects may be implemented in firmware or software which may be executed by a controller, microprocessor or other computing device, although embodiments are not limited thereto. While various embodiments may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The examples may be implemented by computer software stored in a memory and executable by at least one data processor of the involved entities or by hardware, or by a combination of software and hardware. Further in this regard it should be noted that any procedures, e.g., as in FIGS. 12 and 13, may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non-limiting examples.

Alternatively or additionally some examples may be implemented using circuitry. The circuitry may be configured to perform one or more of the functions and/or method steps previously described. That circuitry may be provided in the base station and/or in the communications device.

As used in this application, the term "circuitry" may refer to one or more or all of the following:

(a) hardware-only circuit implementations (such as implementations in only analogue and/or digital circuitry);

(b) combinations of hardware circuits and software, such as:
  (i) a combination of analogue and/or digital hardware circuit(s) with software/firmware and
  (ii) any portions of hardware processor(s) with software (including digital signal processor(s)), software, and memory(ies) that work together to cause an apparatus, such as the communications device or base station to perform the various functions previously described; and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example integrated device.

The foregoing description has provided by way of exemplary and non-limiting examples a full and informative description of some embodiments However, various modifications and adaptations may become apparent to those skilled in the relevant arts in view of the foregoing description, when read in conjunction with the accompanying drawings and the appended claims. However, all such and similar modifications of the teachings will still fall within the scope as defined in the appended claims.

The invention claimed is:

1. An apparatus comprising:
   at least one processor; and
   at least one memory including computer program code,
   the at least one memory and the computer program code configured to, with the at least one processor, cause the apparatus at least to:
   issue a hypertext transfer protocol (HTTP) request message to a first proxy function for forwarding to a network server; and
   receive an HTTP response message from the first proxy function, a header of the HTTP response message comprising information about a signaling capacity of the first proxy function,
   wherein the information about the signaling capacity of the first proxy function comprises at least one of: load control information of the first proxy function, or overload control information of the first proxy function.

2. The apparatus as claimed in claim 1,
   wherein the first proxy function comprises one of: a service communication proxy (SCP) or a security edge protection proxy (SEPP).

3. The apparatus as claimed in claim 1,
   wherein the header further comprises an identifier of the first proxy function to link the information about the signaling capacity of the first proxy function with the first proxy function.

4. The apparatus as claimed in claim 1,
   wherein the at least one memory and the computer program code are further configured to, with the at least one processor, cause the apparatus to:
   issue a further HTTP request message to at least one of: the first proxy function, a further proxy network function, or directly to the network server, based on the information about the signaling capacity of the first proxy function.

5. An apparatus comprising:
   at least one processor; and
   at least one memory including computer program code,
   the at least one memory and the computer program code configured to, with the at least one processor, cause the apparatus at least to:
   receive a hypertext transfer protocol (HTTP) request message from a network client for forwarding to a network server; and
   provide an HTTP response message to the network client, a header of the HTTP response message comprising information about a signaling capacity of the first proxy function,
   wherein the information about the signaling capacity of the first proxy function comprises at least one of: load control information of the first proxy function, or overload control information of the first proxy function.

6. The apparatus as claimed in claim 5,
   wherein the first proxy function comprises one of: a service communication proxy (SCP), or a security edge protection proxy (SEPP).

7. The apparatus as claimed in claim 5,
   wherein the header further comprises an identifier of the first proxy function to link the information about the signaling capacity of the first proxy function with the first proxy function.

8. A method comprising:
   issuing a hypertext transfer protocol (HTTP) request message to a first proxy function for forwarding to a network server; and
   receiving an HTTP response message from the first proxy function, a header of the HTTP response message comprising information about a signaling capacity of the first proxy function,
   wherein the information about the signaling capacity of the first proxy function comprises at least one of: load control information of the first proxy function, or overload control information of the first proxy function.

9. The method as claimed in claim 8,
   wherein the first proxy function comprises one of: a service communication proxy (SCP), or a security edge protection proxy (SEPP).

10. The method as claimed in claim 8,
    wherein the header further comprises an identifier of the first proxy function to link the information about the signaling capacity of the first proxy function with the first proxy function.

11. The method as claimed in claim 8, further comprising:
    issuing a further HTTP request message to at least one of: the first proxy function, a further proxy network function, or directly to the network server, based on the received information about the signaling capacity of the first proxy function.

12. The apparatus as claimed in claim 1,
    wherein the header is a 3rd Generation Partnership Project (3GPP)-Service Based Interface (SBI)-load control information (LCI) header.

13. The apparatus as claimed in claim 1,
    wherein the header is a 3rd Generation Partnership Project (3GPP)-Service Based Interface (SBI)-overload control information (OCI) header.

14. The apparatus as claimed in claim 7,
    wherein the header is a 3rd Generation Partnership Project (3GPP)-Service Based Interface (SBI)-load control information (LCI) header.

15. The apparatus as claimed in claim 7,
    wherein the header is a 3rd Generation Partnership Project (3GPP)-Service Based Interface (SBI)-overload control information (OCI) header.

16. The method as claimed in claim 8,
    wherein the header is a 3rd Generation Partnership Project (3GPP)-Service Based Interface (SBI)-load control information (LCI) header.

17. The method as claimed in claim 8,
    wherein the header is a 3rd Generation Partnership Project (3GPP)-Service Based Interface (SBI)-overload control information (OCI) header.

* * * * *

UNITED STATES PATENT AND TRADEMARK OFFICE
CERTIFICATE OF CORRECTION

| | | |
|---|---|---|
| PATENT NO. | : 11,765,618 B2 | Page 1 of 1 |
| APPLICATION NO. | : 17/201932 | |
| DATED | : September 19, 2023 | |
| INVENTOR(S) | : Bruno Landais et al. | |

It is certified that error appears in the above-identified patent and that said Letters Patent is hereby corrected as shown below:

In the Claims

In Column 16, Line 45, Claim 14, delete "claim 7," and insert -- claim 5, --, therefor.

In Column 16, Line 50, Claim 15, delete "claim 7," and insert -- claim 5, --, therefor.

Signed and Sealed this
Twentieth Day of February, 2024

*Katherine Kelly Vidal*

Katherine Kelly Vidal
*Director of the United States Patent and Trademark Office*